(12) United States Patent
Clark et al.

(10) Patent No.: US 9,073,494 B1
(45) Date of Patent: Jul. 7, 2015

(54) VEHICLE INTERIOR CONVERSATION MIRROR ASSEMBLY

(71) Applicant: Ford Global Technologies, LLC, Dearborn, MI (US)

(72) Inventors: Scott Clark, Ypsilanti, MI (US); Scott Simon, Dexter, MI (US); Michael Chan, Troy, MI (US); Jeffrey Singer, Canton, MI (US); Anthony Ligi, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/295,764

(22) Filed: Jun. 4, 2014

(51) Int. Cl.
*B60R 7/00* (2006.01)
*B60R 1/12* (2006.01)
*E05F 3/14* (2006.01)

(52) U.S. Cl.
CPC ... *B60R 1/12* (2013.01); *E05F 3/14* (2013.01); *B60R 2001/1238* (2013.01); *B60R 2001/1292* (2013.01)

(58) Field of Classification Search
CPC .............. B60R 1/12; B60R 2001/1238; B60R 2001/1292; E05F 3/14
See application file for complete search history.

(56) References Cited

U.S. PATENT DOCUMENTS

| | | | |
|---|---|---|---|
| 6,135,528 A * | 10/2000 | Sobieski et al. | 296/37.7 |
| 6,267,428 B1 * | 7/2001 | Baldas et al. | 296/37.7 |
| 6,553,123 B1 | 4/2003 | Dykstra | |
| 6,619,716 B1 * | 9/2003 | Sturt | 296/37.8 |
| 7,055,883 B2 | 6/2006 | Tokutomi et al. | |
| 8,100,455 B2 | 1/2012 | Lee | |
| 8,157,314 B2 | 4/2012 | Gwon | |
| 2003/0091201 A1 | 5/2003 | Dykstra | |
| 2004/0160087 A1 | 8/2004 | Tiesler | |
| 2005/0134073 A1 | 6/2005 | Tokutomi et al. | |
| 2006/0180583 A1 * | 8/2006 | Jones | 219/202 |
| 2007/0013202 A1 | 1/2007 | Tompson | |
| 2008/0252090 A1 | 10/2008 | Tiesler et al. | |
| 2011/0127793 A1 | 6/2011 | Gwon | |
| 2011/0273868 A1 | 11/2011 | Nagai et al. | |

FOREIGN PATENT DOCUMENTS

| | | |
|---|---|---|
| KR | 20040031437 A | 4/2004 |
| KR | 100847975 B1 | 7/2008 |
| KR | 20090069766 A | 7/2009 |
| WO | 2008122729 A2 | 10/2008 |

OTHER PUBLICATIONS

Bhavani Thota, et al., Entitled "Sliding Conversation Mirror Assembly With Friction Tabs for Vehicle Overhead Console", U.S. Appl. No. 13/735,546, filed Jan. 7, 2013.

* cited by examiner

*Primary Examiner* — Lori L Lyjak
(74) *Attorney, Agent, or Firm* — Vichit Chea; Price Heneveld LLP

(57) ABSTRACT

An overhead console assembly for a vehicle comprising a sunglass bin is disclosed. The sunglass bin defines an outer perimeter configured to be disposed in an overhead console. The overhead console assembly also includes a mirror assembly configured within the outer perimeter of the sunglass bin. The mirror assembly includes an axial engagement assembly that connects the mirror assembly to the sunglass bin. The axial engagement assembly comprises a damper operable to maintain a position of a conversation mirror about a positioning axis relative to the sunglass bin.

20 Claims, 6 Drawing Sheets

US 9,073,494 B1

VEHICLE INTERIOR CONVERSATION MIRROR ASSEMBLY

FIELD OF THE INVENTION

The present disclosure generally relates to a vehicle interior assembly and more particularly relates to an overhead interior assembly comprising a mirror assembly.

BACKGROUND OF THE INVENTION

Space saving designs for various automotive components are becoming increasingly important to ensure that features can be included in the limited space available in modern automobiles. Within the vehicle interior, a conversation mirror, in a deployed or open overhead position, may provide a forward seating occupant a view of rearward portions of a passenger compartment. While utilizing the conversation mirror it may be important that a view from a conventional rear-view mirror is not obstructed. A novel, space saving design for a conversation mirror is disclosed herein. In some implementations, the conversation mirror may also be incorporated in a sunglass bin.

SUMMARY OF THE INVENTION

According to one aspect of the present disclosure, an overhead console assembly for a vehicle comprising a sunglass bin is disclosed. The sunglass bin defines an outer perimeter configured to be disposed in an overhead console. The overhead console assembly also includes a mirror assembly configured to be housed within the perimeter of the sunglass bin. The mirror assembly includes an axial engagement assembly that connects the mirror assembly to the sunglass bin. The axial engagement sub-assembly comprises: a rotary damper, fixed pivot pin and rotational pivot pin which are operable to maintain a position of a conversation mirror about a positioning axis relative to the sunglass bin.

According to another aspect of the present disclosure, an interior vehicle assembly comprising an overhead console, a sunglass bin, and a mirror assembly is disclosed. The sunglass bin is disposed in the overhead console forming a cavity. The cavity is disposed within a perimeter of the sunglass bin. The mirror assembly operates on a separate rotation axis via engagement to the sunglass bin and is housed within the bin cavity in a closed position. The mirror assembly includes a rotary damper retainer with detent feature disposed in two components of the mirror assembly configured to retain the sub-assembly in the closed position.

According to yet another aspect of the present disclosure an overhead console assembly for a vehicle comprising a console defining a cavity is disclosed. The overhead console assembly includes a glasses bin defining an outer perimeter configured to extend from the cavity to provide access to an internal portion of the glasses bin. The overhead console assembly also includes a separate yet integrated mirror assembly housed within the outer perimeter in a closed position. The mirror assembly can be actuated separately from the sunglass bin and is configured to rotate downward/open from the outer perimeter to provide a line of sight extending rearward in the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
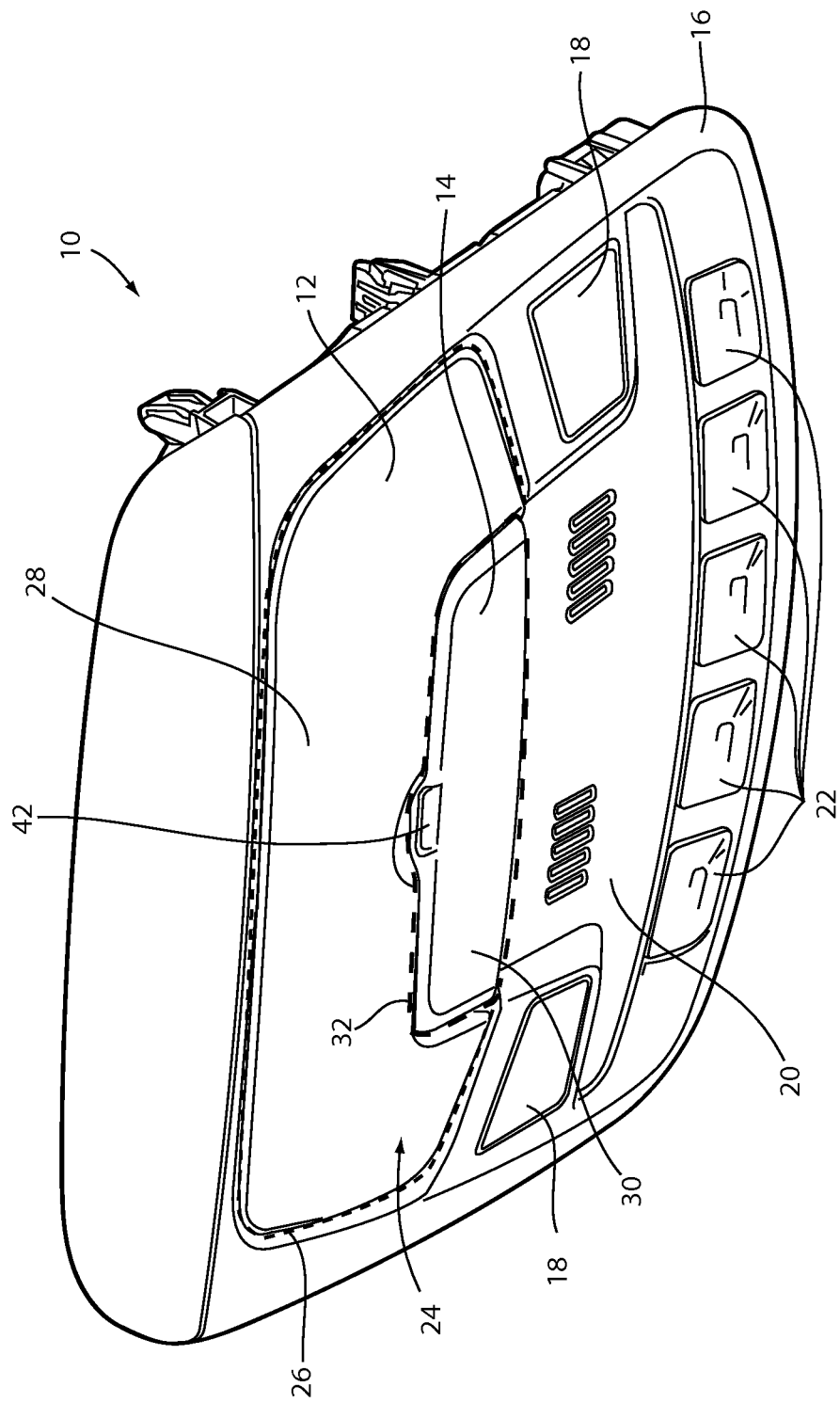
FIG. 1 is an isometric view of an overhead console assembly demonstrating a sunglass bin and a mirror assembly in closed positions.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1 an isometric view of an overhead console assembly 10 for a vehicle is shown. The overhead console assembly 10 is configured to be implemented in a vehicle, for example an automotive vehicle. The overhead console assembly 10 comprises a sunglass bin 12 and a mirror assembly 14 disposed in a console housing 16. The console housing 16 may further be configured to locate a plurality of console components. The console components may comprise a plurality of lighting devices 18, a hands-free speaker assembly 20, and a plurality of switches 22. The plurality of switches 22 may be operable to control a variety of vehicle systems in response to a user input to control the lighting devices 18, door and window locking operations, a dome light or other interior lighting, or any other device that may be utilized in the vehicle.

The overhead console assembly 10 and the various components disposed therein (e.g. elements 12, 14, 18-22) may be formed of various materials. For example, the overhead console assembly 10 may be formed of various polymeric materials and metallic materials, as well as fiberglass, carbon fiber, fabric, and any other materials suitable for implementation in a vehicle. The plurality of switches 22 may comprise electrical switches in communication with a variety of vehicle systems and in some embodiments may comprise biased switches or toggle switches. The lighting devices 18 may be implemented by any type of lighting device, for example halogen, incandescent, fluorescent, light emitting diodes (LED), etc.

The sunglass bin 12 as discussed herein may comprise any form of storage bin, tray, or any other form of compartment configured to provide a selectively accessible storage pocket or cavity. In some implementations, the sunglass bin 12 may be configured to have an interior portion defining interior dimensions to facilitate the storage of one or more items. In an exemplary embodiment, the sunglass bin 12 may have an interior portion configured to store glasses, sunglasses, or any other items having similar dimensional properties. In the various implementations discussed herein, the sunglass bin 12 may be configured for storage of one or more items by providing selective access to the interior portion.

The mirror assembly 14 may comprise any form of mirror assembly, display, user interface, or any other device that may be selectively accessible in the overhead console assembly 10. In some implementations, the mirror assembly 14 may comprise a conversation mirror assembly comprising a mirror element that may be selectively accessed in an open position and stowed in a space-saving closed position. The mirror element may comprise a convex mirror element configured to provide a line of sight from a front passenger portion of the vehicle to a rear passenger portion of the vehicle. The mirror element as described herein may be of any form of reflective material operable to reflect light to provide a reflective surface to facilitate the line of sight.

In an exemplary implementation, the console housing 16 defines a cavity or storage cavity 24. The storage cavity 24 is configured to have dimensions corresponding to a storage perimeter 26 of the sunglass bin 12. As demonstrated in FIG. 1, the sunglass bin 12 and the mirror assembly 14 are each positioned in closed positions. The storage cavity 24 and the storage perimeter 26 may further correspond to the dimensions of an exterior surface 28 of the sunglass bin 12. For example, the console housing 16 may define the storage cavity 24 such that the storage perimeter 26 of the sunglass bin 12 and the storage cavity 24 form a slip fit rotating assembly.

In the closed position, the mirror assembly 14 is substantially housed within the storage perimeter 26 of the sunglass bin 12. Positioned as shown in FIG. 1, an exterior surface 30 of the mirror assembly 14 is substantially vertically aligned with the exterior surface 28 of the sunglass bin 12. For example, the sunglass bin 12 may form a volumetric profile shape defining a three-dimensional perimeter. Within the three-dimensional perimeter, a portion of which is shown by the storage perimeter 26, a mirror cavity may be formed within the perimeter of the sunglass bin as partially shown by the mirror assembly perimeter 32. The mirror assembly 14 may also form a volumetric profile shape defining a three-dimensional perimeter that may be housed within the three-dimensional perimeter of the sunglass bin 12 when the mirror assembly 14 is in the closed position. Further details describing the relationship of the console housing 16, the sunglass bin 12, and the mirror assembly 14 are discussed in further detail herein.

Figure 2:
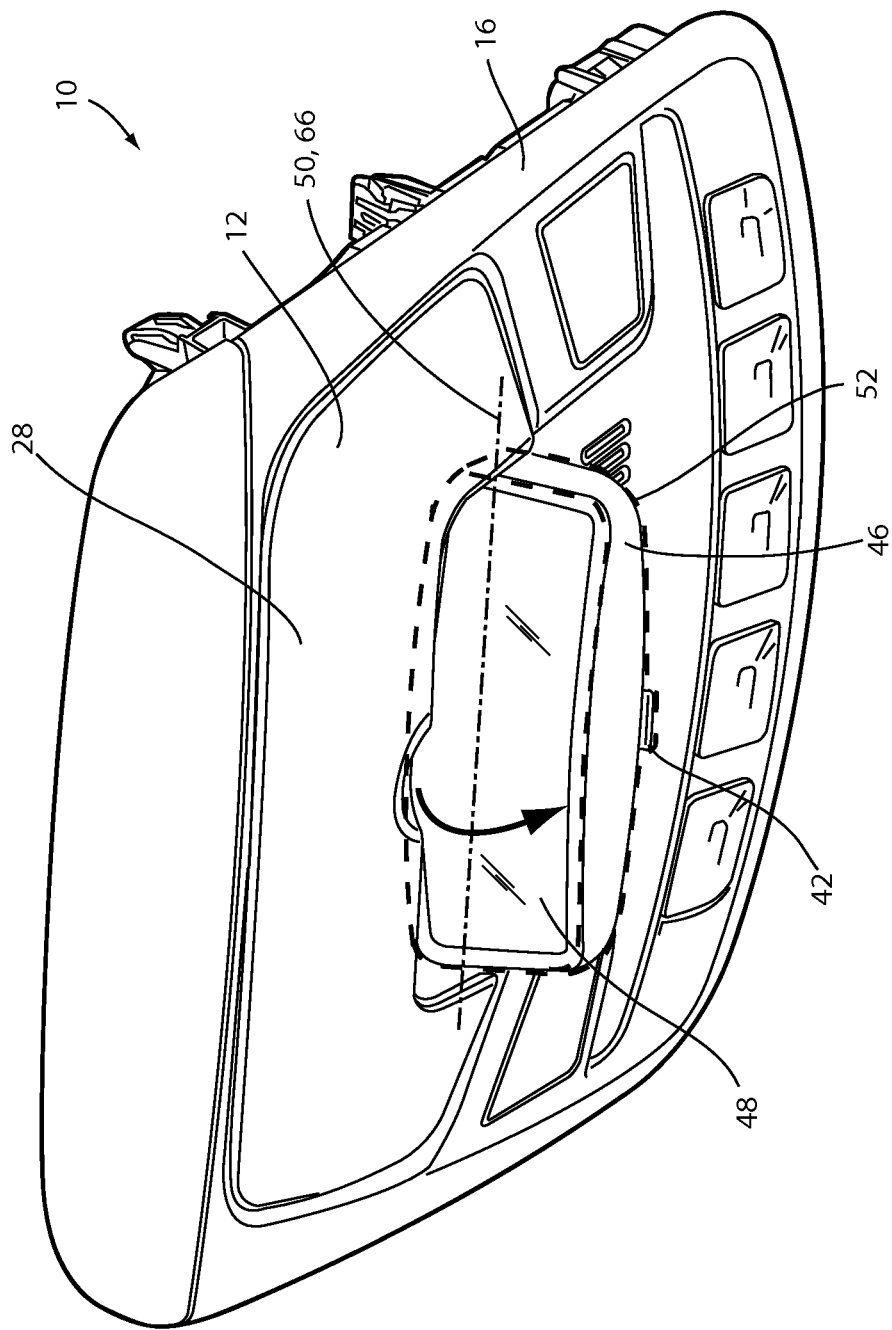
FIG. 2 is an isometric view of an overhead console assembly demonstrating a mirror assembly in an open position.

Referring FIG. 2, an isometric view of the overhead console assembly 10 is shown demonstrating the mirror assembly 14 in an open position. In the open position, the mirror assembly 14 extends outward from the console housing 16. The mirror assembly 14 is selectively accessible by an occupant of the vehicle by applying a downward force on a mirror tab 42 as demonstrated by the arrow 44. The mirror tab 42 may extend from the exterior surface 30 of the mirror assembly 14. The mirror assembly 14 further comprises a mirror housing 46 connected to the exterior surface 30 that is configured to support the mirror element 48. The mirror assembly 14 is connected to the sunglass bin 12 by an axial engagement assembly along a first axis or a positioning axis 50. Further details of the three-dimensional perimeter 52 of the mirror assembly 14 are further visible in the open position.

Referring now to FIGS. 1 and 2, the mirror assembly 14 may be accessed by rotating about the mirror positioning axis 50. For example from the closed position, an occupant of the vehicle may press downward on the tab 42 as shown in FIG. 1 and rotate the mirror assembly 14 to the position shown in FIG. 2 or any position therebetween. The axial engagement assembly may be configured to provide for the mirror assembly 14 to be selectively positioned about the positioning axis 50 to align a line of sight from the front passenger compartment of the vehicle to the rear passenger compartment of the vehicle based on a height or preference of an occupant.

Figure 3:
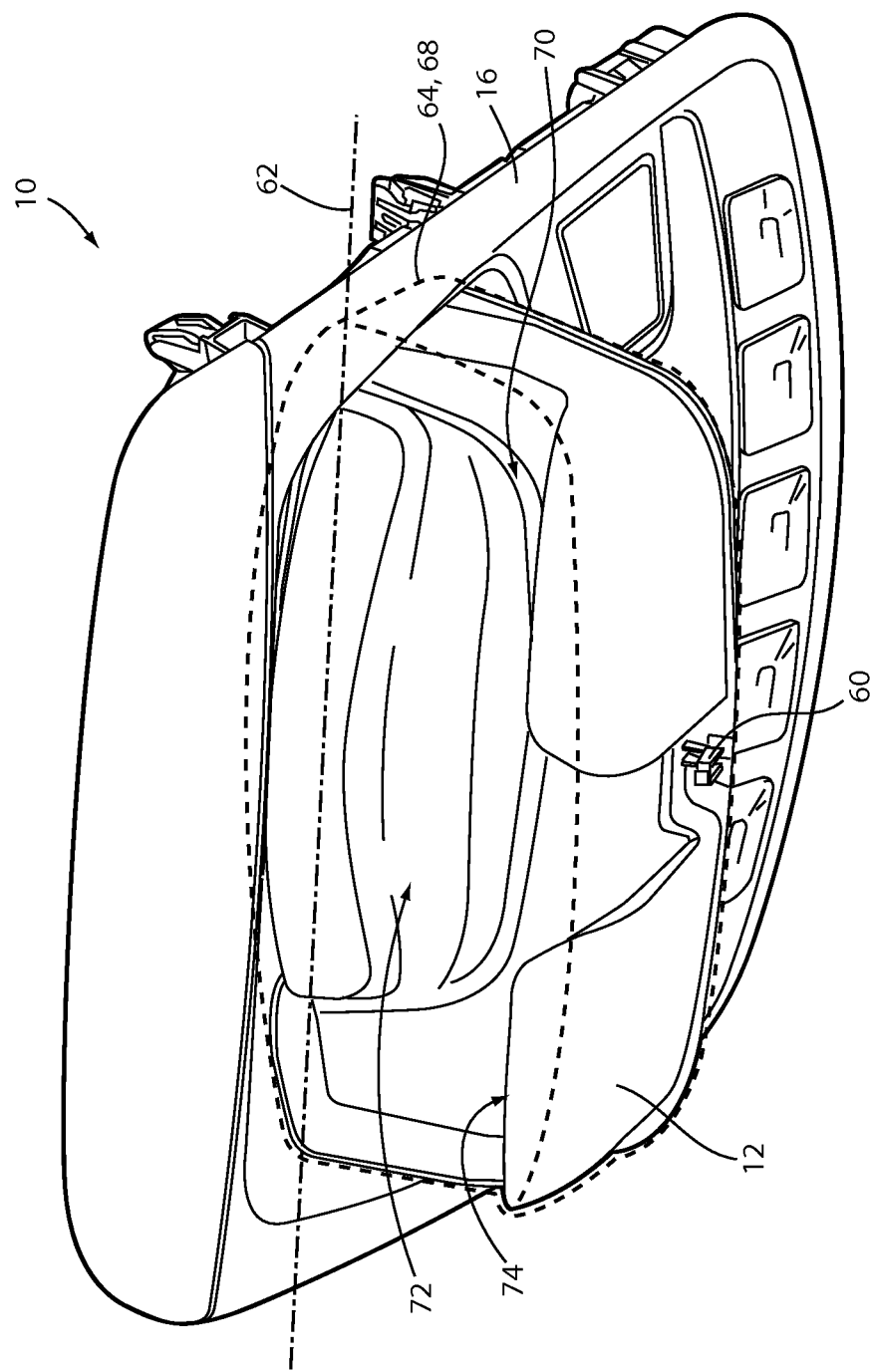
FIG. 3 is an isometric view of an overhead console assembly demonstrating a sunglass bin in an open position.

Referring to FIG. 3, an isometric view of the overhead console assembly 10 is shown demonstrating the sunglass bin 12 in an open position. In the open position, the sunglass bin 12 extends outward from the console housing 16 of the overhead console assembly 10. The sunglass bin 12 may be accessed by an occupant of the vehicle by applying force to the exterior surface 28 to engage a push spring latch 60 or any other mechanism operable to retain the sunglass bin 12. The sunglass bin 12 is connected to the console housing 16 along a second axis or storage bin axis 62.

The sunglass bin 12 may be configured to rotate about the storage bin axis 62 when rotating from the closed position to the open position and vice versa. The storage bin axis 62 may be oriented parallel to the mirror positioning axis 52 and offset by a distance corresponding to the dimensional proportions of the sunglass bin 12 and the mirror assembly 14. A three-dimensional perimeter 64 of the sunglass bin 12 may further be visible in the open position. The three-dimensional perimeter 64 of the sunglass bin 12 may also be configured to accommodate the three-dimensional perimeter 50 of the mirror assembly 14 in the open position.

As shown in FIG. 3 with the mirror assembly 14 and the sunglass bin 12 both in open positions, the three-dimensional perimeter 50 of the mirror assembly 14 is configured to enter and be located significantly within the three-dimensional perimeter 64 of the sunglass bin 12. For example, when the sunglass bin 12 is open and extended outward from the console housing 16 about the storage bin axis 62, the mirror is positioned within the mirror cavity 72 of the sunglass bin 12. The relative orientation of the sunglass bin 12 and the mirror assembly 14 is similar to that of each in the closed positions. This space-saving configuration provides for the console housing 16 to efficiently accommodate both the sunglass bin 12 and the mirror assembly 14 within a single volumetric space (e.g. the three dimensional perimeter 64 of the sunglass bin 12). Hereinafter, the three-dimensional perimeter 50 of the mirror assembly 14 will be referred to as the mirror assembly perimeter 66, and the three-dimensional perimeter 64 of the sunglass bin 12 will be referred to as a storage bin perimeter 68.

In the open position, an interior portion 70 of the sunglass bin 12 is shown. A reverse side of the mirror cavity 72 demonstrates a complementary profile of the sunglass bin 12 configured to accommodate the mirror assembly perimeter 66. The sunglass bin 12 is configured to accommodate the mirror assembly perimeter 66 while providing a storage compartment 74 in the interior portion 70 configured to store items, for example sunglasses, glasses, writing utensils, etc. The overhead console assembly 10 as described herein may provide various benefits including efficiently providing access to interior vehicle storage (e.g. the storage compartment 74) and the mirror assembly 14 while utilizing limited space within the vehicle.

Figure 4A:
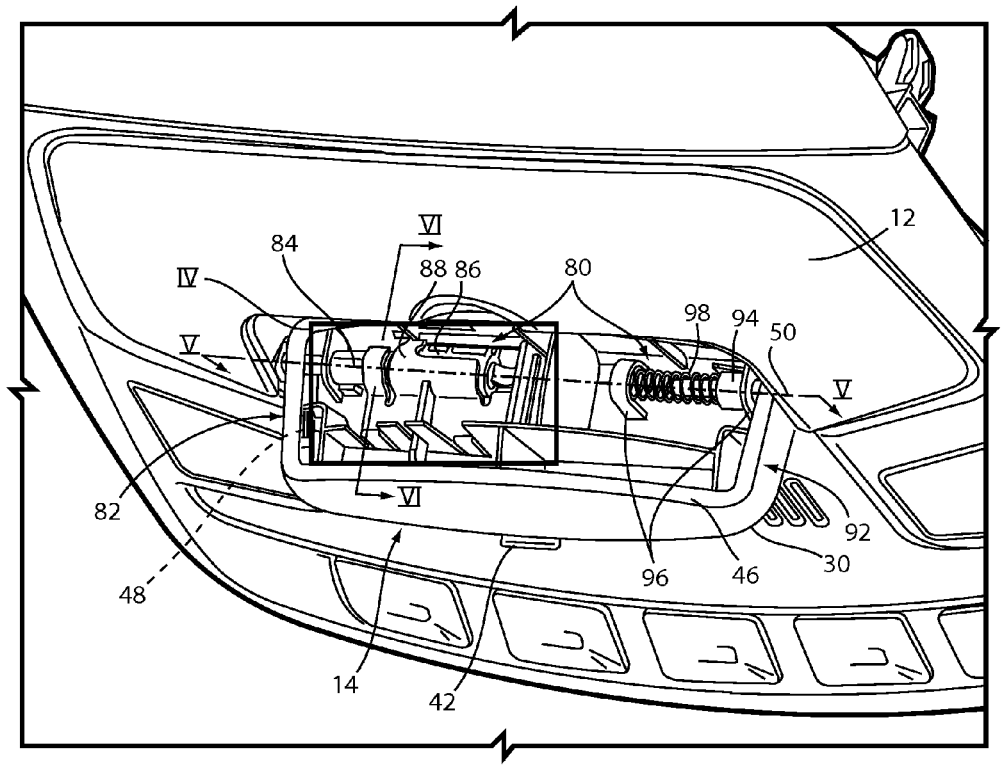
FIG. 4A is a detailed isometric view of a mirror assembly with a mirror element hidden demonstrating an axial engagement assembly.

Referring to FIG. 4A, a detailed isometric view of the mirror assembly 14 is shown with the mirror element 48 hidden demonstrating an axial engagement assembly 80. The axial engagement assembly 80 is substantially enclosed within the mirror assembly perimeter 66 to further provide for an enhanced, space-saving configuration. The axial engagement assembly 80 is configured to engage the sunglass bin 12 proximate a first end portion 82 of the mirror assembly 14 via a fixed pin 84. The longitudinal axis of the fixed pin 84 extends along the positioning axis 50 and is further in connection with a damper 86. The damper 86 is configured control and the rotation of the mirror assembly 14 about the positioning axis 50.

The damper 86 is disposed within the mirror assembly 14 and may be configured to allow the mirror assembly 14 to be selectively positioned about the positioning axis 50. For example, the damper may comprise a rotary viscous damper having sufficient damping to resist gravitational motion and inertial motion caused by the vehicle traveling over bumpy roads while allowing an occupant of the vehicle to align a position of the mirror element 48 by applying pressure to the tab 42. The damper is connected to the mirror housing 46 by a damper retainer 88. The damper retainer 88 is configured to affix the damper 86 to the mirror housing 46 such that the rotation of the mirror assembly 14 is controlled by the damping of the damper 86. In this configuration, the mirror assembly 14 may be selectively positioned to align a line of sight from the front passenger compartment of the vehicle directed to the rear passenger compartment of the vehicle based on a height or preference of the occupant.

The axial engagement assembly 80 is further configured to engage the sunglass bin 12 proximate a second end portion 92 of the mirror assembly 14 via an assembly pin 94. The assembly pin 94 may be configured to engage an aperture of the sunglass bin 12 and freely rotate about the positioning axis 50. In some implementations, the assembly pin 94 may be connected to the mirror housing 46 by a plurality of brackets 96 and may further be configured to retract along the positioning axis 50 by engaging a linear spring 98. During assembly, the spring loaded assembly pin 94 may be retracted into the mirror assembly 14 to provide for the mirror assembly 14 to be inserted into the mirror cavity 72 and be rotationally supported by the sunglass bin 12. In this way, the mirror assembly 14 may be easily assembled with the sunglass bin 12.

Though various implementations of the mirror assembly 14 are described as forming a portion of the overhead console assembly 10 in connection with the sunglass bin 12, the mirror assembly 14 may be implemented in any overhead interior portion of a vehicle. For example, the mirror assembly may be disposed in a vehicle headliner to provide a rear facing view of a passenger compartment. When implemented independent of the overhead console assembly 10, the mirror assembly 14 may interact with a portion of the vehicle headliner configured to engage the axial engagement assembly 80. The mirror assembly 14 may engage the portion of the vehicle headliner in a configuration similar to that described in reference to the sunglass bin 12. In this way, the mirror assembly may provide for a compact conversation mirror configured to be conveniently adjusted by the axial engagement assembly to provide a vehicle occupant with a rear facing view in any vehicle passenger compartment.

Figure 4B:
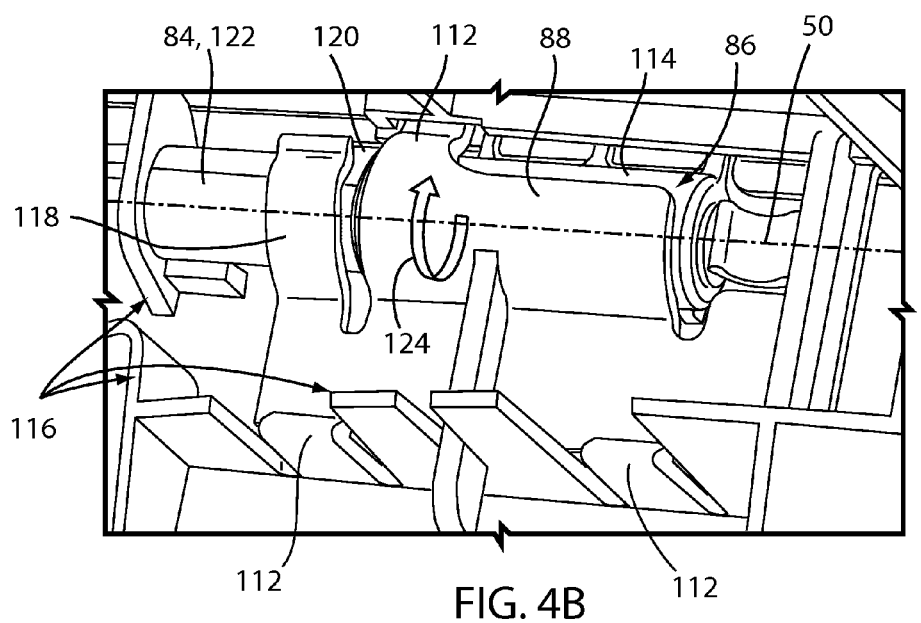
FIG. 4B is a detailed view of section IV demonstrating an axial engagement assembly comprising a damper.

Referring to FIG. 4B, a detailed view of section IV is shown demonstrating an axial engagement assembly 80 including the damper 86 and the damper retainer 88. As illustrated in FIG. 4B, the mirror assembly 14 is shown in the open position. The mirror housing 46 may comprise a plurality of retaining clips 112 configured to affix the damper retainer 88 and a damper body 114 of the damper 86 to the mirror housing 46. The mirror housing 46 may further comprise a plurality of stiffening and support features 116 configured to support the fixed pin 84, the damper 86, the damper retainer 88, and structurally stiffen the mirror housing 46.

An engaging end of a shaft of the damper 86 is in connection with the fixed pin 84 such that the rotational motion of the mirror assembly 14 is controlled by the damping or resistive force of the damper 86. Further details of axial engagement assembly 80 are discussed in reference to FIGS. 5-6B. The damper 86 may be implemented by any form of rotational damper, and in some implementations, may be a torque damper. For example, the damper 86 may be implemented as a rotary damper, a vane damper, or any other form of damper. The damper 86 may utilize fluid resistance to limit the motion of the mirror assembly 14 about the positioning axis 50. Various forms of dampers may be implemented in accordance with the disclosure to provide a viscous resistive force configured to limit the motion of the mirror assembly 14 due to gravity and inertial forces that may be applied to the mirror assembly 14 during operation of the vehicle. The damping or braking force of the damper 86 may be configured to allow the mirror assembly 14 to rotate about the positioning axis 50 in response to a force applied to the tab 42 by an occupant of the vehicle.

The damper retainer 88 and the fixed pin 84 may comprise a detent feature configured to secure the mirror assembly 14 in the closed position. The damper retainer 88 may be in connection with or form a detent clip 118 corresponding to a first mating portion of the detent feature. The detent clip 118 is configured to engage a protrusion 120 or groove detail extending from an outer surface 122 of the fixed pin 84. The protrusion 120 corresponds to a second mating portion of the detent feature. By rotating the mirror assembly 14 about the positioning axis 50 along a first rotational arrow 124, the detent clip 118 is configured to engage the protrusion 120 to retain the mirror assembly 14 in the closed position. In this configuration, the mirror assembly 14 may be secured in the closed position to prevent the mirror assembly 14 from disengaging the sunglass bin 12 when the sunglass bin 12 is accessed by an occupant of the vehicle.

Figure 5:
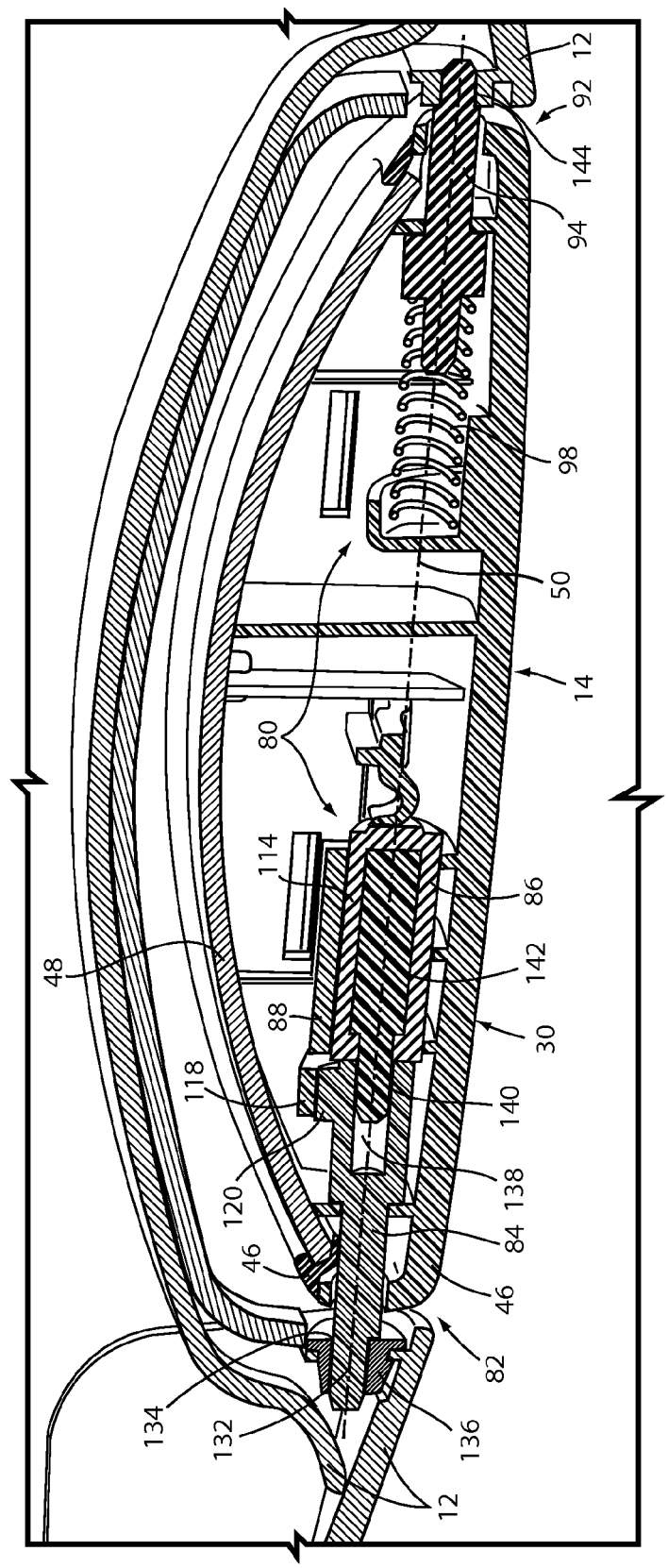
FIG. 5 is a cross-sectional view along section line V of a sunglass bin and a mirror assembly in closed positions demonstrating an axial engagement assembly.

Referring to FIG. 5, a cross-sectional view along section line V of the sunglass bin 12 and the mirror assembly 14 is shown. In FIG. 5, the sunglass bin 12 and the mirror assembly 14 are both shown in the closed positions. The axial engagement assembly 80 is shown engaging the sunglass bin 12 proximate the first end portion 82 and the second end portion 92 of the mirror assembly 14. The fixed pin 84 may comprise a notched or keyed, pin end portion 132 configured to engage a corresponding sleeve aperture 134 of a retaining sleeve 136 affixed to the sunglass bin 12. The sleeve aperture 134 may comprise a mating profile configured to engage the pin end portion 132 and prevent rotation of the fixed pin 84 relative to the sunglass bin 12.

The fixed pin 84 extends along the positioning axis 50 and may further comprise a pin aperture 138 configured to engage a notched or keyed, damper end portion 140. The pin aperture 138 may comprise a mating profile configured to engage the damper end portion 140 to prevent rotational movement of a shaft 142 of the damper 86 relative to the sunglass bin 12. The shaft 142 extends into the damper body 114 which is further connected to the mirror housing 46 by the damper retainer 88. In this configuration, the damper body 114 is connected to the mirror housing 46 such that the damping or brake force of the damper 86 provides a controlled rotation of the mirror assembly 14 relative to the sunglass bin 12.

As shown in the closed position, the detent clip 118 is shown engaging the protrusion 120 such that the mirror assembly 14 is retained in the closed position. Further, the assembly pin 94 and the linear spring 98 are shown engaging an aperture 144 of the sunglass bin 12. The assembly pin 94 is configured to freely rotate about the positioning axis 50 such that the damper 86 may provide control of the rotational movement of the mirror assembly 14 about the positioning axis 50.

Figure 6A:
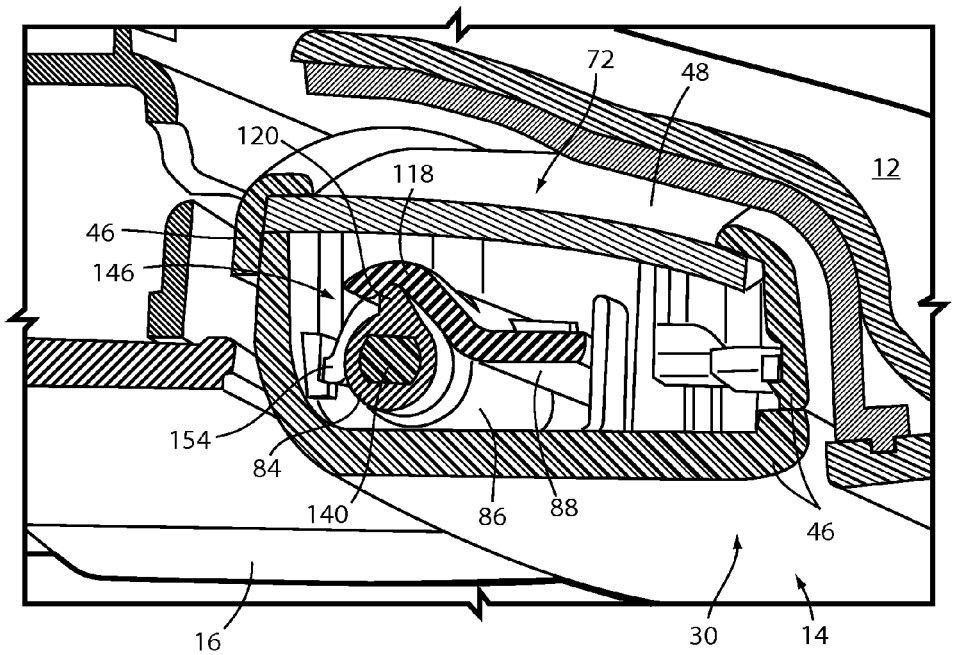
FIG. 6A is a cross-sectional view along section line VI of an axial engagement assembly demonstrating a detent feature of a mirror assembly in a closed position.
Figure 6B:
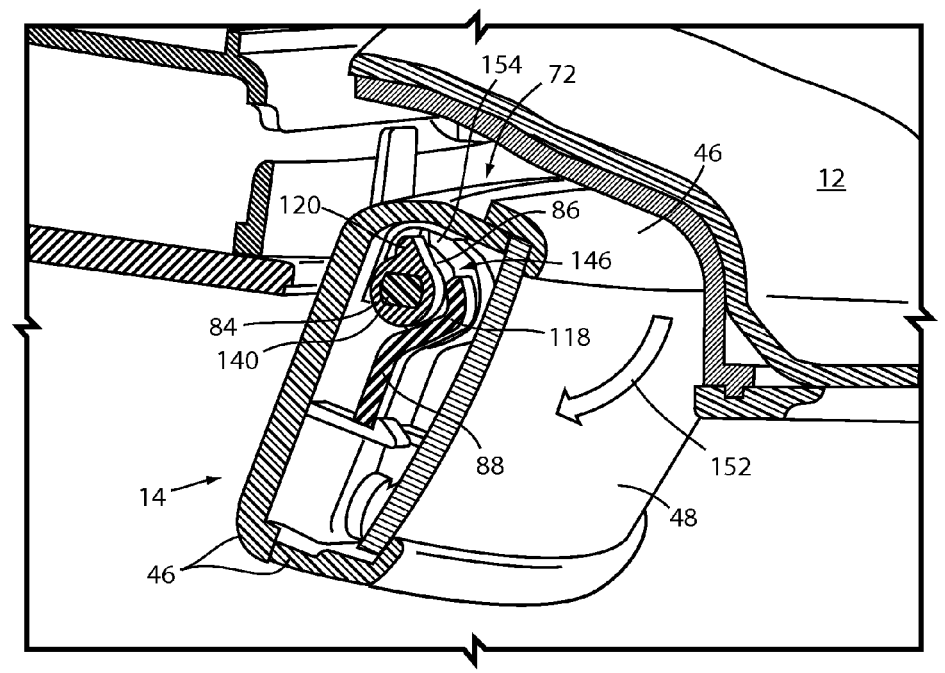
FIG. 6B is a cross-sectional view along section line VI of axial engagement assembly demonstrating a detent feature of a mirror assembly in an open position in accordance with the disclosure.

Referring to FIGS. 6A and 6B cross-sectional views along section lines VI of the axial engagement assembly 80 are shown demonstrating the detent feature 146 of the mirror assembly 14 in the closed position and the open position respectively. In the closed position as shown in FIG. 6A, the mirror assembly 14 is retained by the interaction of the detent clip 118 engaging the protrusion 120. In the open position as shown in FIG. 6B, the mirror assembly 14 may be adjusted and maintained in any position along arrow 152 by the damping force applied by the damper 86 on the fixed pin 84 through the damper end portion 140. In this way, the mirror assembly 14 may be retained in a closed position by the detent clip 118 and the protrusion 120 and may also be maintained in any position along the arrow 152 by the damper 86.

The mirror assembly 14 may further be prevented from a maximum rotational extent about the positioning axis 50 by a retaining clip 154 attached to or formed from the damper retainer 88. The retaining clip 154 may be configured to interact with a rotation limiting feature of the sunglass bin 12 via a slotted portion of the mirror housing 46 to prevent rotation beyond a predetermined rotation along the arrow 152. The interaction between the retaining clip 154 and the slotted portion of the mirror housing 46 may provide for a positive stop to prevent the mirror assembly 14 from rotating beyond a predetermined rotation about the positioning axis 50.

As shown in FIGS. 6A and 6B, the mirror cavity 72 is shown providing a pocket for stowing the mirror assembly perimeter 66 of the mirror assembly 14 within the storage bin perimeter 68. As described herein, the overhead console assembly 10 provides an efficient and accessible storage space as described in detail in reference to the sunglass bin 12. The disclosure further provides for a mirror assembly 14 to be accommodated within the storage bin perimeter 68 in the closed position. Though specific embodiments are described in reference to a specific configuration and interaction of the sunglass bin 12 and mirror assembly 14, it shall be understood that various arrangements, connectors, intermediate components, and other various detailed features of the assemblies and components discussed herein may vary without departing from the spirit of the disclosure. Further, it shall be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An overhead console assembly for a vehicle comprising:
   a sunglass bin defining an outer perimeter configured to be disposed in an overhead console; and
   a mirror assembly configured to be housed in the outer perimeter of the sunglass bin and comprising:
   an axial engagement assembly connecting the mirror assembly to the sunglass bin comprising a damper operable to maintain a position of a conversation mirror about an independent positioning axis relative to the sunglass bin.

2. The overhead console assembly according to claim 1, wherein the damper is housed within the mirror assembly.

3. The overhead console assembly according to claim 1, wherein the damper comprises a rotational viscous damper.

4. The overhead console assembly according to claim 1, wherein the axial engagement assembly comprises a fixed pin in connection with the rotational viscous damper configured to connect a first end portion of the conversation mirror to the sunglass bin.

5. The overhead console assembly according to claim 4, wherein the axial engagement assembly comprises a spring-loaded assembly pin to connect a second end portion of the mirror assembly to the sunglass bin.

6. The overhead console assembly according to claim 5, wherein the assembly pin is arranged coaxially with the fixed pin about the positioning axis to rotationally extend from the sunglass bin to provide a line of sight extending rearward in the vehicle.

7. The overhead console assembly according to claim 6, wherein the sunglass bin is configured to rotationally extend from the overhead console assembly about a second axis parallel to the positioning axis to provide access to an interior portion of the sunglass bin.

8. An interior vehicle assembly comprising:
   a mirror assembly configured to rotatably engage an overhead portion of a vehicle forming a cavity, wherein the mirror assembly is housed within the cavity in a closed position, the mirror assembly comprising:
   a detent feature disposed in a housing of the mirror assembly configured to retain the closed position; and
   a rotational damper disposed in the housing and configured to maintain a rotational position of the mirror assembly relative to the overhead portion.

9. The interior assembly according to claim 8, wherein the overhead portion comprises a sunglass bin forming the cavity, the cavity disposed within a perimeter of the sunglass bin.

10. The interior vehicle assembly according to claim 9, wherein the mirror assembly further comprises:
    a fixed pin configured to engage an aperture of the sunglass bin to connect a first end portion of the mirror assembly to the sunglass bin.

11. The interior vehicle assembly according to claim 10, wherein the rotational damper rotates about a longitudinal axis of the fixed pin to control the rotatable engagement of the mirror assembly relative to the sunglass bin.

12. The interior vehicle assembly according to claim 10, wherein the mirror assembly further comprises:
    a rotational damper retainer with a groove detail creating the detent feature, the detent feature configured to engage the fixed pin for retention of the mirror assembly in the closed position.

13. The interior vehicle assembly according to claim 10, wherein the fixed pin comprises a groove detail of the detent feature configured to be rotatably engaged by a detent clip to retain the mirror assembly in the closed position.

14. The interior vehicle assembly according to claim 9, wherein the mirror assembly rotatably engages the sunglass bin about a first axis.

15. The interior vehicle assembly according to claim 14, wherein the sunglass bin rotatably engages the overhead console about a second axis, the first axis being substantially parallel to the second axis.

16. An overhead console assembly for a vehicle comprising:

a console defining a cavity;

a glasses bin defining an outer perimeter and configured to extend from the cavity to provide access to an internal portion of the glasses bin; and a mirror assembly housed within the outer perimeter in a closed position and configured to extend from the outer perimeter to provide a line of sight extending rearward in the vehicle in an open position.

17. The overhead console assembly according to claim 16, wherein the mirror assembly is configured to extend rotationally about a first axis outward from the outer perimeter in an open position.

18. The overhead console assembly according to claim 17, wherein the sunglass bin is configured to extend rotationally about a second axis outward from the cavity, the second axis being offset from and substantially parallel to the first axis.

19. The overhead console assembly according to claim 17, wherein the mirror assembly is configured to engage the sunglasses bin along the first axis via an axial engagement assembly comprising a rotational damper configured to control the rotational motion of the mirror assembly.

20. The overhead console assembly according to claim 19, wherein the rotational damper is disposed within the mirror assembly.

* * * * *